United States Patent
Kitamura

(10) Patent No.: US 7,369,185 B2
(45) Date of Patent: May 6, 2008

(54) BROADCAST RECEIVING APPARATUS AND METHOD HAVING VOLUME CONTROL

(75) Inventor: Takashi Kitamura, Ome (JP)

(73) Assignee: Kabushiki Kaisha Toshiba, Toyko (JP)

( * ) Notice: Subject to any disclaimer, the term of this patent is extended or adjusted under 35 U.S.C. 154(b) by 570 days.

(21) Appl. No.: 11/019,812

(22) Filed: Dec. 20, 2004

(65) Prior Publication Data

US 2005/0264705 A1 Dec. 1, 2005

(30) Foreign Application Priority Data

May 31, 2004 (JP) ............................. 2004-162117
Jun. 29, 2004 (JP) ............................. 2004-192048

(51) Int. Cl.
*H04N 5/60* (2006.01)

(52) U.S. Cl. .................................................. 348/738

(58) Field of Classification Search ................ 348/738, 348/725, 473, 729, 737, 553, 478; 381/107, 381/104, 108, 57
See application file for complete search history.

(56) References Cited

U.S. PATENT DOCUMENTS

| | | | | |
|---|---|---|---|---|
| 5,172,358 A | * | 12/1992 | Kimura | 369/47.26 |
| 5,268,964 A | * | 12/1993 | Watts | 381/107 |
| 5,363,147 A | * | 11/1994 | Joseph et al. | 348/738 |
| 5,369,440 A | * | 11/1994 | Sussman | 725/28 |
| 5,434,926 A | * | 7/1995 | Watanabe et al. | 381/108 |
| 5,444,783 A | * | 8/1995 | Na | 381/57 |
| 5,483,297 A | * | 1/1996 | Song | 348/737 |
| 5,631,714 A | * | 5/1997 | Saadoun | 348/738 |
| 5,778,077 A | * | 7/1998 | Davidson | 381/57 |
| 6,188,439 B1 | * | 2/2001 | Kim | 348/553 |
| 2004/0146167 A1 | * | 7/2004 | Bennett | 381/59 |
| 2007/0086604 A1 | * | 4/2007 | Guillorit | 381/107 |

FOREIGN PATENT DOCUMENTS

JP          6-177686          6/1994

* cited by examiner

*Primary Examiner*—Paulos M. Natnael
(74) *Attorney, Agent, or Firm*—Foley & Lardner LLP

(57) ABSTRACT

A receiving apparatus includes a receiving unit configured to receive a signal including a program, an acquiring unit configured to acquire information representing a category of the program received by the receiving unit, a volume data generating unit configured to generate volume data related to a controlled volume in accordance with volume control performed when the program is being received by the receiving unit, and a memory unit storing volume data and category data in association with each other. The memory unit is read for retrieving the category data of the program currently being received and the sound volume is automatically set according to the volume data stored in the memory unit which is associated with the category data of the current program.

22 Claims, 14 Drawing Sheets

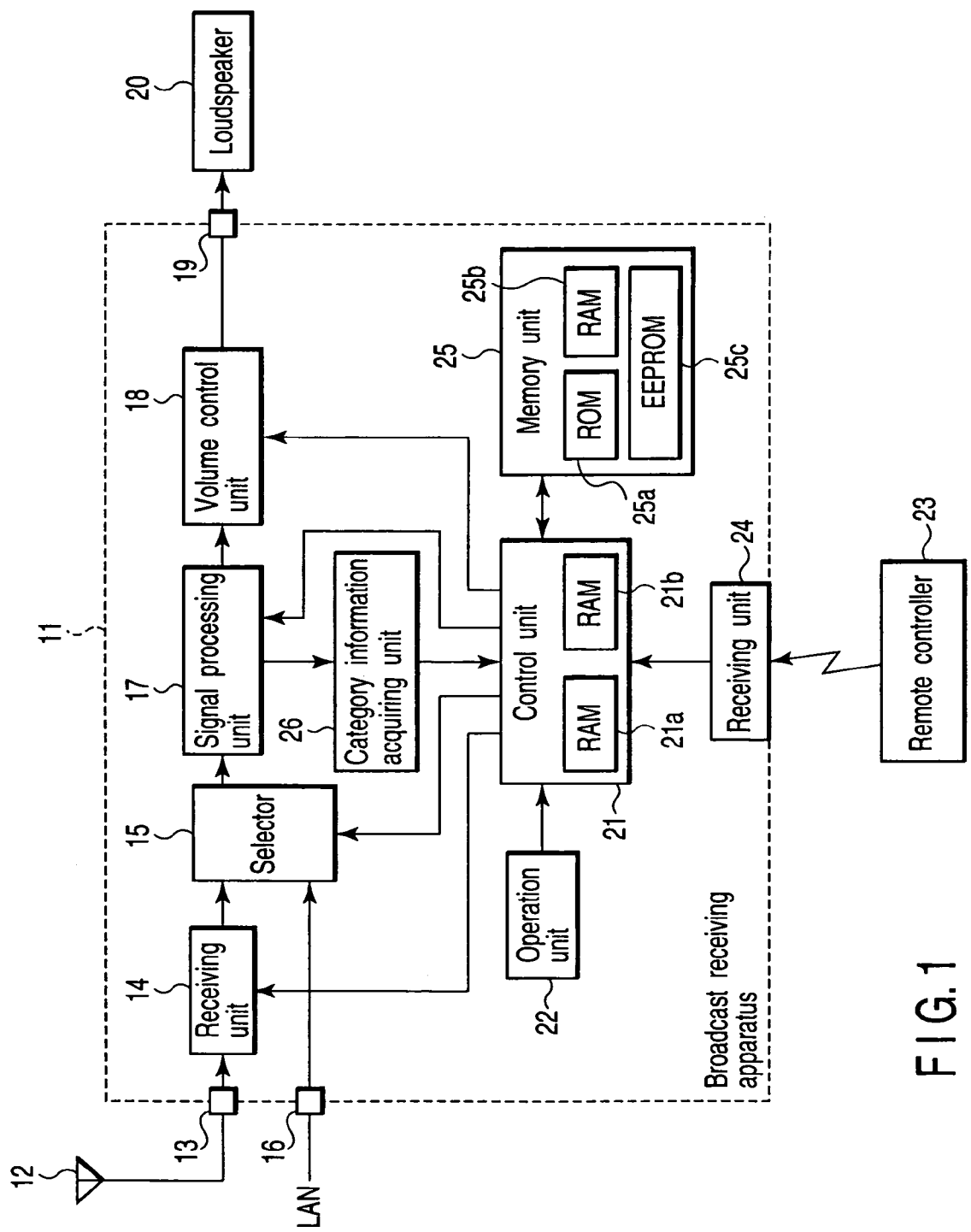
F I G. 1

FIG. 2

| Category | Category information |
|---|---|
| A | 00001 |
| B | 00010 |
| C | 00100 |
| ⋮ | ⋮ |

FIG. 3

| Category | Volume data |
|---|---|
| A | 0011 |
| B | 0010 |
| C | 0100 |
| ⋮ | ⋮ |

FIG. 7

| Category | Time zone | Volume data |
|---|---|---|
| A | Early morning | 0011 |
| A | Daytime | 0100 |
| A | Midnight | 0011 |
| B | Early morning | 0010 |
| B | Daytime | 0011 |
| B | Midnight | 0010 |
| C | Early morning | 0100 |
| C | Daytime | 0110 |
| C | Midnight | 0101 |
| ⋮ | ⋮ | ⋮ |

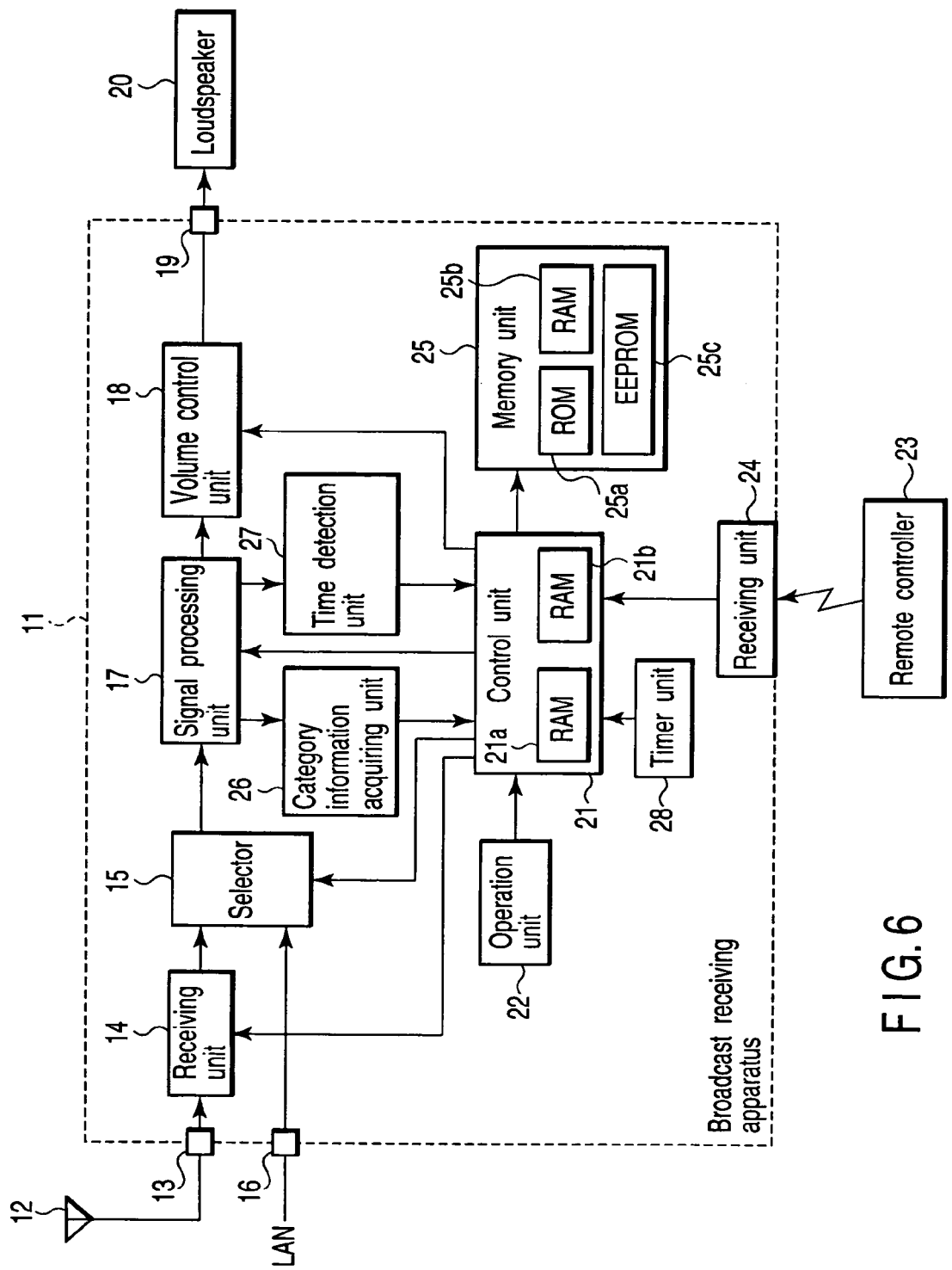
F I G. 6

| Source | Volume data |
|---|---|
| Analog broadcast | 0011 |
| Digital broadcast | 0101 |
| VTR | 1100 |
| DVD | 0111 |

FIG. 11

| Source | Time zone | Volume data |
|---|---|---|
| Analog broadcast | Early morning | 0011 |
| | Daytime | 0100 |
| | Midnight | 0010 |
| Digital broadcast | Early morning | 0101 |
| | Daytime | 0111 |
| | Midnight | 0011 |
| VTR | Early morning | 1100 |
| | Daytime | 1110 |
| | Midnight | 1000 |
| DVD | Early morning | 0111 |
| | Daytime | 1010 |
| | Midnight | 0011 |

FIG. 15

BROADCAST RECEIVING APPARATUS AND METHOD HAVING VOLUME CONTROL

CROSS-REFERENCE TO RELATED APPLICATIONS

This application is based upon and claims the benefit of priority from prior Japanese Patent Applications No. 2004-162117, filed May 31, 2004; and No. 2004-192048, filed Jun. 29, 2004, the entire contents of both of which are incorporated herein by reference.

BACKGROUND OF THE INVENTION

1. Field of the Invention

The present invention relates to a broadcast receiving apparatus and a broadcast receiving method which receive a broadcast signal to reproduce sound and, more particularly, to a broadcast receiving apparatus and a broadcast receiving method which control a volume of reproduced sound. The invention also relates to a sound reproducing apparatus and a sound reproducing method which reproduce sound on the basis of an input signal and, more particularly, to a sound reproducing apparatus and a sound reproducing method which control a volume of reproduced sound.

2. Description of the Related Art

As is well known, for example, in a television broadcast receiving apparatus or the like, a user can set a sound volume at a predetermined output level with an operation independently of a program to be received. For this reason, a TV program which is being watched is changed from, for example, a "news" program to a "movie" program, a sound volume also changes. Each time the programs are switched, a user must control the sound volume to an appropriate volume.

Jpn. Pat. Appln. KOKAI Publication No. 6-177686 discloses the configuration of a sound reproducing apparatus which automatically controls a sound volume by controlling tone quality while preventing a set volume from changing. However, Jpn. Pat. Appln. KOKAI Publication No. 6-177686 does not describe any measure which can prevent a change in volume occurring when programs are switched.

BRIEF SUMMARY OF THE INVENTION

According to an embodiment of the present invention, there is disclosed an audio receiving method comprising receiving a plurality of programs including audio signals; adjusting sound volumes produced by the audio signals by utilizing inputs from a user for the plurality of received programs; acquiring data representing at least one of (1) a category of each of the plurality of programs, (2) a time period during the day in which the plurality of programs is received and (3) a source for the plurality of programs; storing, in a memory, associations of the adjusted sound volumes and the at least one of (1) the category of each of the plurality of programs, (2) the time period during the day in which the plurality of programs is received and (3) the source for the plurality of programs; and receiving a current program having a current audio signal; and automatically adjusting a sound volume produced by the current audio signal in accordance with the stored associations.

According to another embodiment of the present invention, there is provided an audio receiver apparatus having a receiver for receiving a plurality of programs including audio signals; a sound volume adjusting device for adjusting sound volumes produced by the audio signals by utilizing inputs from a user for the plurality of received programs; an input data unit for obtaining data representing at least one of (1) a category of each of the plurality of programs, (2) a time period during the day in which the plurality of programs is received and (3) a source for the plurality of programs; a memory for storing associations of the adjusted sound volumes and the input data representing the at least one of (1) the category of each of the plurality of programs, (2) the time period during the day in which the plurality of programs is received and (3) the source for the plurality of programs; and a control processor connected to receive the data from the input data unit and connected to receive the stored associations from the memory for automatically adjusting a sound volume produced by a current audio signal of a current program in accordance with the associations stored in the memory.

According to yet another embodiment of the present invention, there is provided a sound reproducing apparatus having a receiving unit configured to selectively receive signals from a plurality of sources including an audio signal; a control unit responsive to the plurality of sources for generating source data corresponding to each of the plurality of sources; a volume data generating unit configured to generate volume data corresponding to a controlled volume in accordance with volume control operations performed by a user when the source received by the receiving unit is watched; a memory unit configured to store the source data in association with the volume data; and the control unit connected to the memory unit for automatically adjusting a sound volume of a current program in accordance with source data of the current program and the associated volume data stored in the memory unit.

According to another embodiment of the present invention, there is provided a sound reproducing apparatus having a receiving unit for selectively receive signals from a plurality of sources; a control unit responsive to the plurality of sources for generating source data corresponding to each of the plurality of sources; a volume data generating unit for generating volume data corresponding to a controlled volume in accordance with volume control performed when the source received by the receiving unit is watched; a detection unit configured to detect switching between one of the plurality of sources to another of the plurality of sources from the receiving unit; a memory unit for storing in response to a detection result from the detection unit source data and associated volume data of a program being watched immediately before switching of the source; a processing unit for generating audio signals from the signals received by the receiving unit; a volume control unit for converting the audio signals generated by the processing unit into a volume signal corresponding to the volume data; and the control unit reading from the storage unit the volume data associated with source data of a currently watched program and supplying the read volume data to the volume control unit.

In accordance with yet another embodiment of the invention, there is disclosed a sound reproducing method comprising selectively receiving signals from a plurality of sources including an audio signal; generating an audio signal of the received source; generating source data corresponding to each of the plurality of sources; converting the generated audio signal into a volume signal corresponding to volume data stored in a memory; and reading from the memory the volume data associated with the source data of a currently received program, the read volume data used in the converting step.

BRIEF DESCRIPTION OF THE SEVERAL VIEWS OF THE DRAWING

FIG. 1 is a block diagram showing a first embodiment of the invention to explain a broadcast receiving apparatus;

FIG. 2 is a diagram for explaining category information that is received by the broadcast receiving apparatus according to the first embodiment;

FIG. 3 is a diagram for explaining a table in which categories and volume data in the broadcast receiving apparatus according to the first embodiment;

FIG. 6 is a block diagram showing a second embodiment of the invention to explain a broadcast receiving apparatus;

FIG. 7 is a diagram for explaining a table in which categories, time zones, and volume data of the broadcast receiving apparatus according to the second embodiment are associated with each other;

FIG. 11 is a diagram for explaining a table in which sources and volume data of the broadcast receiving apparatus according to the third embodiment are associated with each other;

FIG. 15 is a diagram for explaining a table in which sources, time zones, and volume data of the broadcast receiving apparatus according to the fourth embodiment are associated with each other;

DETAILED DESCRIPTION OF THE INVENTION

Figure 4:
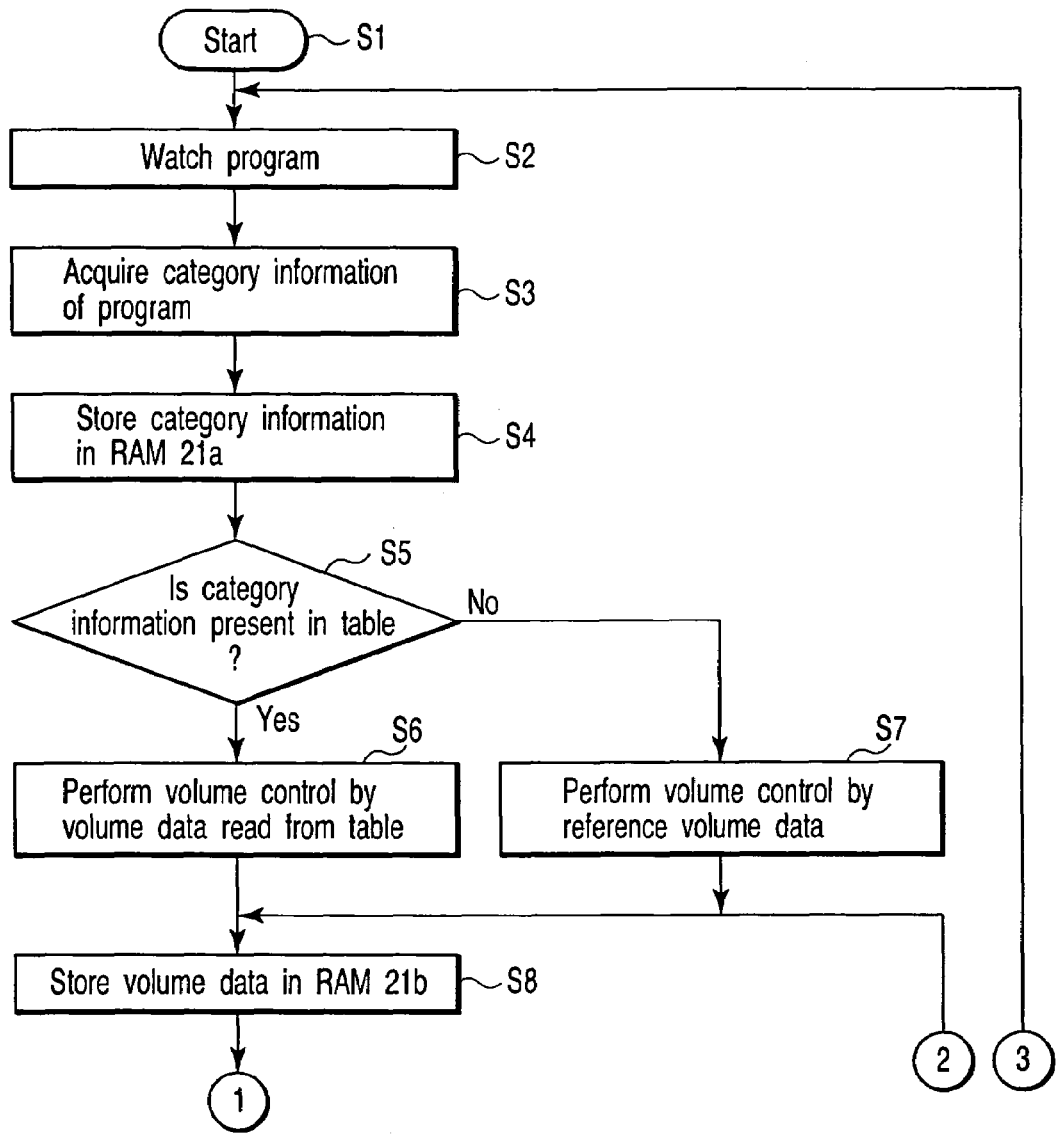
FIG. 4 is a flow chart for explaining a part of a main operation of the broadcast receiving apparatus according to the first embodiment.

A first embodiment of the invention will be described below with reference to the accompanying drawings. FIG. 1 shows a broadcast receiving apparatus 11 which will be described in the first embodiment. The broadcast receiving apparatus 11 comprises a function of receiving a digital broadcast and a function of receiving a digital transmission signal from an external LAN (Local Area Network).

More specifically, a digital broadcast signal is received by an antenna 12 and supplied to a receiving unit 14 through a TV input terminal 13. This receiving unit 14 extracts a signal of a predetermined channel from the input digital broadcast signal to output the signal to a selector 15.

A digital transmission signal acquired from an external LAN is supplied to the selector 15 through an input terminal 16. The selector 15 selectively switches between the digital broadcast signal and the digital transmission signal to guide the selected one to a signal processing unit 17.

The digital broadcast signal and the digital transmission signal include programs to be watched by a user.

The signal processing unit 17 processes the digital signals to provide analog video and audio signals from the input digital signal or the digital transmission signal to output the audio signal to a volume control unit 18. The volume control unit 18 performs an amplification process to the input audio signal such that a volume corresponding to externally supplied volume data is obtained.

The audio signal amplified by the volume control unit 18 is supplied to a loudspeaker 20 through a sound output terminal 19, and sound is reproduced with the volume corresponding to the volume data. Processing for a video signal output from the signal processing unit 17 will be omitted in the following description for descriptive convenience.

In the broadcast receiving apparatus 11, all the operations including the above various receiving operations are integrally controlled by a control unit 21. The control unit 21 incorporates a CPU (Central Processing Unit) or the like. The control unit 21 receives operation information from an operation unit 22 or receives operation information transmitted from a remote controller 23 through a receiving unit 24 and controls the respective units to reflect the operation contents.

In this case, the control unit 21 uses a memory unit 25. More specifically, the memory unit 25 mainly includes a ROM (Read Only Memory) 25a in which a control program executed by the CPU of the control unit 21 is stored, a RAM (Random Access Memory) 25b which provides a work area to the CPU, and an EEPROM (Electrically Erasable and Programmable Read Only Memory) 25c in which various tables, setting information, control information, and the like are stored.

The control unit 21 comprises a RAM 21a for temporarily storing information representing the category of a program (as will be described later) and a RAM 21b for temporarily storing the volume data output to the volume control unit 18.

The signal processing unit 17 acquires EPG (Electronic Program Guide) data from the received digital broadcast signal or the digital transmission signal to output the EPG data to the category information acquiring unit 26.

The category information acquiring unit 26 (serving as an input data unit) acquires information or data representing a category (for example, movies, sports, news, dramas, music, hobbies, commercials and the like) from the input EPG data to output the information to the control unit 21.

This category information, for example, as shown in FIG. 2, is constituted by a plurality of bits (5 bits in this drawing). Flags "1" are on at different bits for each of categories A, B, C, ... The control unit 21 updates the category information stored in the RAM 21a each time the category information is acquired.

On the other hand, when a user performs a volume control operation with the operation unit 22 or the remote controller 23, (serving as sound volume adjusting devices) the control unit 21 generates volume data corresponding to the operation, temporarily stores the volume data in the RAM 21b, and outputs the volume data to the volume control unit 18. Thus, in this operation, the control unit is programmed to serve as a volume data generating unit which accepts input from the operation unit 22 or remote controller 23 and produces volume data which is stored in the RAM 21b and fed to the volume control unit 18. Also in this case, the control unit 21 updates the volume data stored in the RAM 21b each time the volume data is changed.

The control unit 21, as shown in FIG. 3, forms a table in which categories (information) and volume data are associated with each other to store the table in the EEPROM 25c of the memory unit 25. In this case, the volume data is, e.g., 4-bit data. In accordance with the value of the data, a gain of the volume control unit 18 is determined.

When programs are switched or when a power supply switch included in the operation unit 22 of the broadcast receiving apparatus 11 is turned off, category information of a program temporarily stored in the RAM 21a of the control unit 21 and volume data temporarily stored in the RAM 21b are stored in the table in association with each other.

For this reason, when the control unit 21 receives a program of the same category as that of a program received in the past, the control unit 21 reads volume data corresponding to the category from the table in the memory unit 25 to supply the volume data to the volume control unit 18. In this manner, the volumes of programs of the same category are automatically controlled to be equal to each other. The automatic adjusting of the sound volume in accordance with the data associations stored in the table uses a control processor which is connected to receive the category information from the category information acquiring unit 26 and is also connected to receive the data associations or table stored in the memory unit 25. The control processor may be implemented by the control unit 21 operating under software control.

Figure 5:
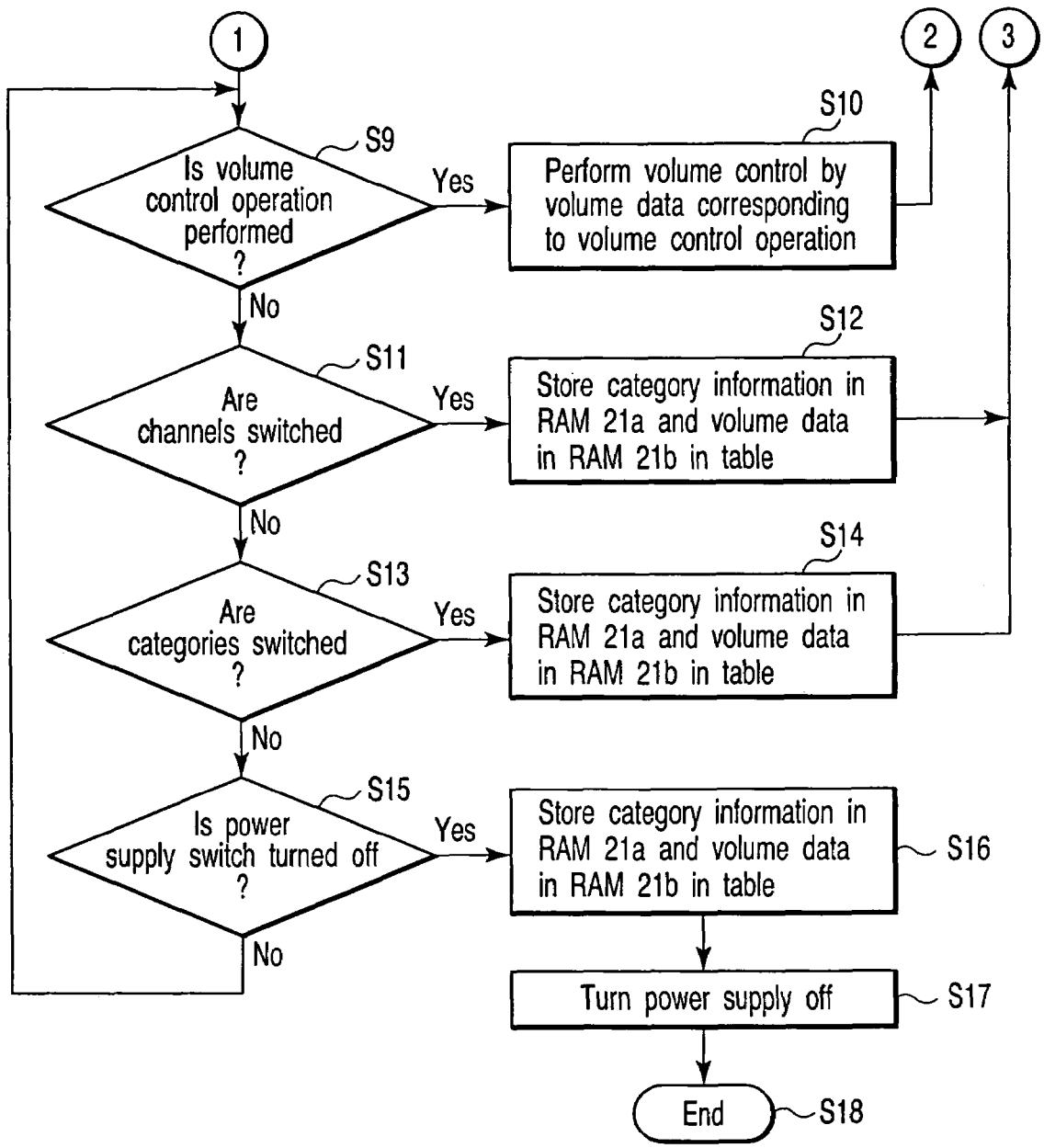
FIG. 5 is a flow chart for explaining the rest of the operation of the main operation of the broadcast receiving apparatus according to the first embodiment.

FIGS. 4 and 5 show flow charts collectively showing the automatic volume control operation. When the processes are started (step S1), and when a predetermined program is watched in step S2, the control unit 21 acquires category information of the program in step S3. In step S4, the control unit 21 temporarily stores the category information in the RAM 21a.

The control unit 21 checks in step S5 whether or not the acquired category information is stored in the table in the EEPROM 25c of the memory unit 25. When it is determined that the category information is stored (YES), the control unit 21 reads the volume data from the table and supplies the volume data to the volume control unit 18 to automatically control the volume in step S6.

When it is determined in step S5 that the acquired category information is not stored in the table (NO), the control unit 21 reads reference volume data stored as a set value in the EEPROM 25c in advance and supplies the reference volume data to the volume control unit 18 to automatically control the volume in step S7.

After step S6 or S7, the control unit 21 temporarily stores the volume data used in step S6 or step S7 in the RAM 21b in step S8.

Thereafter, the control unit 21 checks in step S9 whether or not a volume control operation is performed by the operation unit 22 or the remote controller 23. When it is determined that the volume control operation is performed (YES), volume data corresponding to the volume control operation is generated to change the volume in step S10. The resultant volume data is temporarily stored in the RAM 21b in step S8.

When it is determined in step S9 that the volume control operation is not performed (NO), the control unit 21 checks in step S11 whether or not reception channels are switched.

When it is determined that the reception channels are switched (YES), in step S12, the category information temporarily stored in the RAM 21a and the volume data temporarily stored in the RAM 21b are associated with each other and stored in the table in the EEPROM 25c to return the control flow to the process in step S2.

On the other hand, if it is determined in step S11 that the reception channels are not switched (NO), the control unit 21 checks in step S13 whether or not the categories of programs are switched as for example when a new program starts after having displayed a program of a different category. When it is determined that the categories are switched (YES), in step S14, the category information temporarily stored in the RAM 21a and the volume data temporarily stored in the RAM 21b are associated with each other and stored in the table in the EEPROM 25c to return the control flow to the process in step S2.

When it is determined in step S13 that the categories are not switched (NO), the control unit 21 checks in step S15 whether or not power supply switches arranged in the operation unit 22 and the remote controller 23 in the broadcast receiving apparatus 11 are turned off. When it is determined that the power supply switches are not turned off (NO), the control flow returns to the process in step S9.

In addition, it is determined in step S15 that the power supply switches are turned off (YES), the control unit 21 associates the category information temporarily stored in the RAM 21a and the volume data temporarily stored in the RAM 21b with each other and stores the category information and the volume data in the table in the EEPROM 25c in step S16. In step S17, the control unit 21 turns off the power supply of the broadcast receiving apparatus 11 to end the processes (step S18).

According to the first embodiment, when reception channels are switched, when categories of received programs are switched, and when the power supply switch is turned off, the category of an immediately previously received program and volume data corresponding to a volume set at this time are stored in the table in the EEPROM 25c of the memory unit 25 in association with each other.

For this reason, when a program of the same category as that of the previously received program is received, volume data corresponding to the category is read from the table in the memory unit 25 to supply the volume data to the volume control unit 18, so that the volume is automatically controlled to set a predetermined volume for programs of the same category. For this reason, handling for a user can be made convenient.

FIG. 6 shows a second embodiment of the invention. The second embodiment will be described below such that the same reference numerals as in FIG. 1 denote the same parts in FIG. 6. The signal processing unit 17 described above outputs EPG data to a time detection unit 27. The time detection unit 27 acquires time information from the EPG data to output the time information to the control unit 21.

A timer unit 28 may also be provided for connection connected to the control unit 21. For this case, the control unit 21 can acquire time information from the time detection unit 27 and/or the timer unit 28 as needed. Thus, if no timer information is available from the time detection unit 27, the time information may be obtained from the timer unit 28. The time detection unit 27 and timer unit 28 also serve as input data units to provide time period data representing the time of day during which the programs are received.

The control unit 21 divides one day into a plurality of time zones, e.g., "early morning", "daytime", and "midnight". As shown in FIG. 7, a table in which categories (information)

of programs, time zones, and volume data are associated with each other is formed and stored in the EEPROM 25c of the memory unit 25. For this reason, a volume can be automatically changed depending on time zones such that volumes of programs of the same category are set to be smaller at midnight than in the daytime. The automatic adjusting of the sound volume in accordance with the data associations stored in the table memory uses a control processor which is connected to receive the category information from the category information acquiring unit 26 and the time information from at least one of the time detection unit 26 and the timer unit 28. The control processor is also connected to receive the data associations or table stored in the memory unit 25. The control processor may be implemented by the control unit 21 operating under software control.

Figure 8:
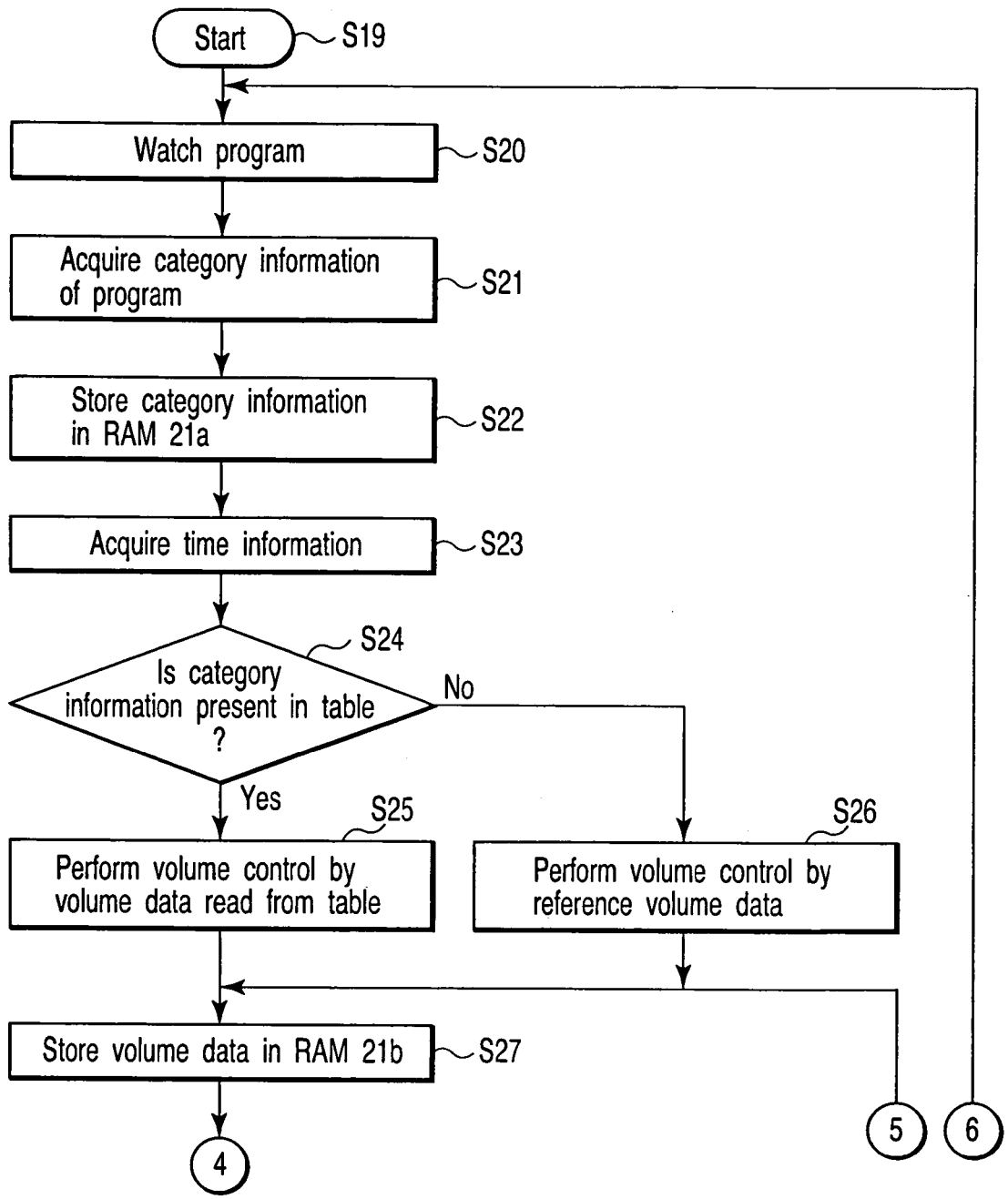
FIG. 8 is a flow chart for explaining a part of a main operation of the broadcast receiving apparatus according to the second embodiment.
Figure 9:
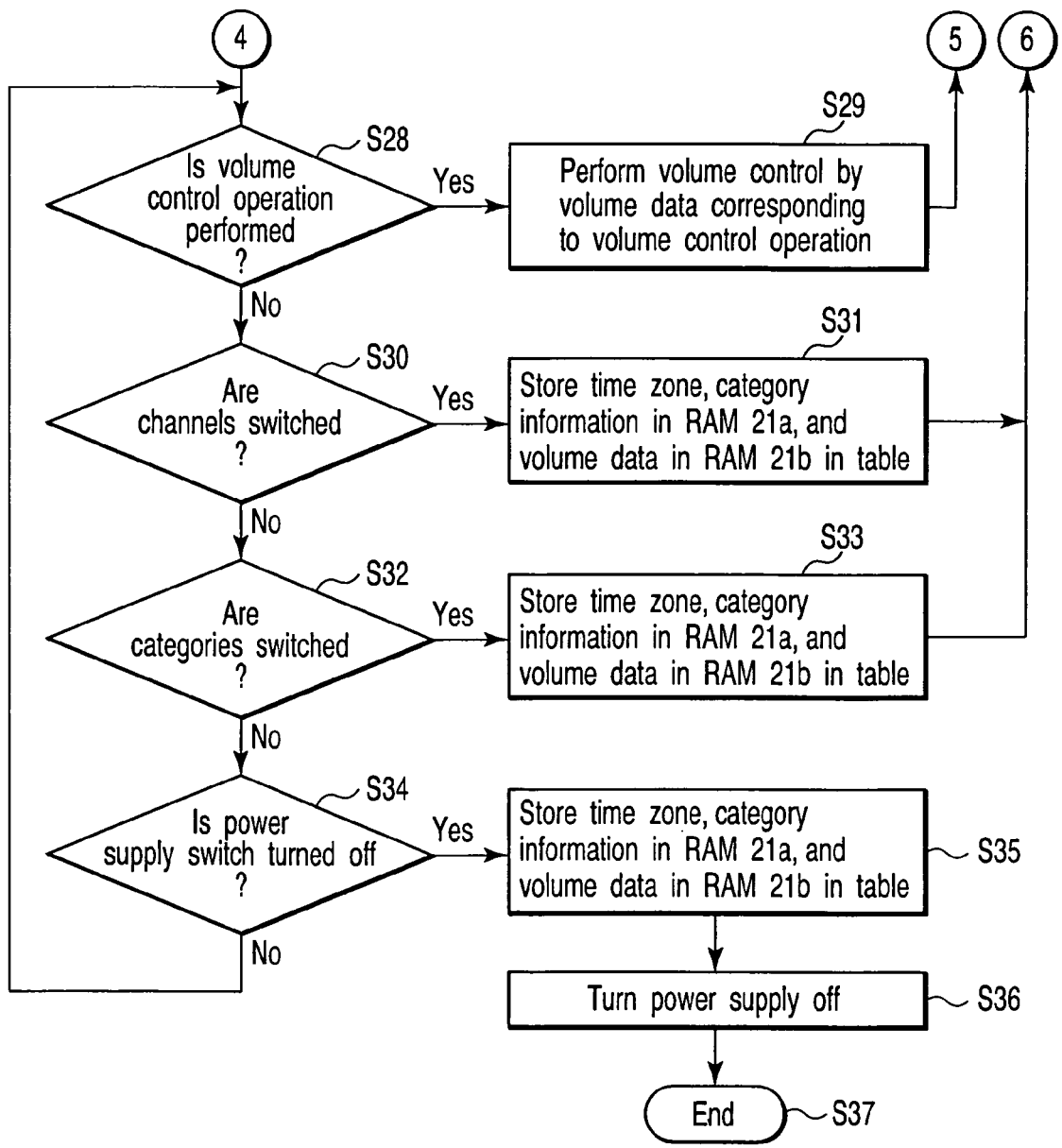
FIG. 9 is a flow chart for explaining the rest of the main operation of the broadcast receiving apparatus according to the second embodiment.

FIGS. 8 and 9 show flow charts collectively showing the automatic volume control operation. When the processes are started (step S19), and when a predetermined program is watched in step S20, the control unit 21 acquires category information of the program in step S21. In step S22, the control unit 21 temporarily stores the acquired category information in the RAM 21a. In step S23, the control unit 21 acquires current time from either the timer detection unit 27 or the timer unit 28.

The control unit 21 checks in step S24 whether or not the acquired category information is stored in the table in the EEPROM 25c of the memory unit 25. When it is determined that the category information is stored (YES), the control unit 21 reads the volume data stored in the table in the memory unit 25 in association with the acquired category information and a time zone including the acquired current time and supplies the volume data to the volume control unit 18 to automatically control the volume in step S25.

When it is determined in step S25 that the acquired category information is not stored in the table (NO), the control unit 21 reads reference volume data stored as a set value in the EEPROM 25c in advance and supplies the reference volume data to the volume control unit 18 to automatically control the volume in step S26.

After step S25 or S26, the control unit 21 temporarily stores the volume data used in step S25 or step S26 in the RAM 21b in step S27.

Thereafter, the control unit 21 checks in step S28 whether or not a volume control operation is performed by the operation unit 22 or the remote controller 23. When it is determined that the volume control operation is performed (YES), volume data corresponding to the volume control operation is generated to change the volume in step S29. The resultant volume data is temporarily stored in the RAM 21b in step S27.

When it is determined in step S28 that the volume control operation is not performed (NO), the control unit 21 checks in step S30 whether or not reception channels are switched. When it is determined that the reception channels are switched (YES), in step S31, the time zone including the current time acquired in step S23, the category information temporarily stored in the RAM 21a, and the volume data temporarily stored in the RAM 21b are associated with each other and stored in the table in the EEPROM 25c to return the control flow to the process in step S20.

On the other hand, it is determined in step S30 that the reception channels are not switched (NO), the control unit 21 checks in step S32 whether or not the categories of programs are switched. When it is determined that the categories are switched (YES), in step S33, the time zone including the current time acquired in step S23, the category information temporarily stored in the RAM 21a, the volume data temporarily stored in the RAM 21b are associated with each other and stored in the table in the EEPROM 25c to return the control flow to the process in step S20.

When it is determined in step S32 that the categories are not switched (NO), the control unit 21 checks in step S34 whether or not power supply switches arranged in the operation unit 22 and the remote controller 23 in the broadcast receiving apparatus 11 are turned off. When it is determined that the power supply switches are not turned off (NO), the control flow returns to the process in step S28.

In addition, if it is determined in step S34 that the power supply switches are turned off (YES), the control unit 21 associates the time zone including the current time acquired in step S23, the category information temporarily stored in the RAM 21a, and the volume data temporarily stored in the RAM 21b with each other and stores the time zone, the category information, and the volume data in the table in the EEPROM 25c in step S35. In step S36, the control unit 21 turns off the power supply of the broadcast receiving apparatus 11 to end the processes (step S37).

According to the second embodiment, since categories (information) of programs, time zones, and volume data are stored in the table in the memory unit 25 in association with each other, volumes can be automatically changed depending on time zones even in programs of the same category, and handling for a user can be more convenient.

In the first and second embodiments, the description is made on the assumption that the broadcast receiving apparatus 11 receives a digital broadcast. However, when control information including information representing the category of a program, information representing time, and the like is broadcasted, the present invention can be applied to an apparatus which receives an analog broadcast.

Figure 10:
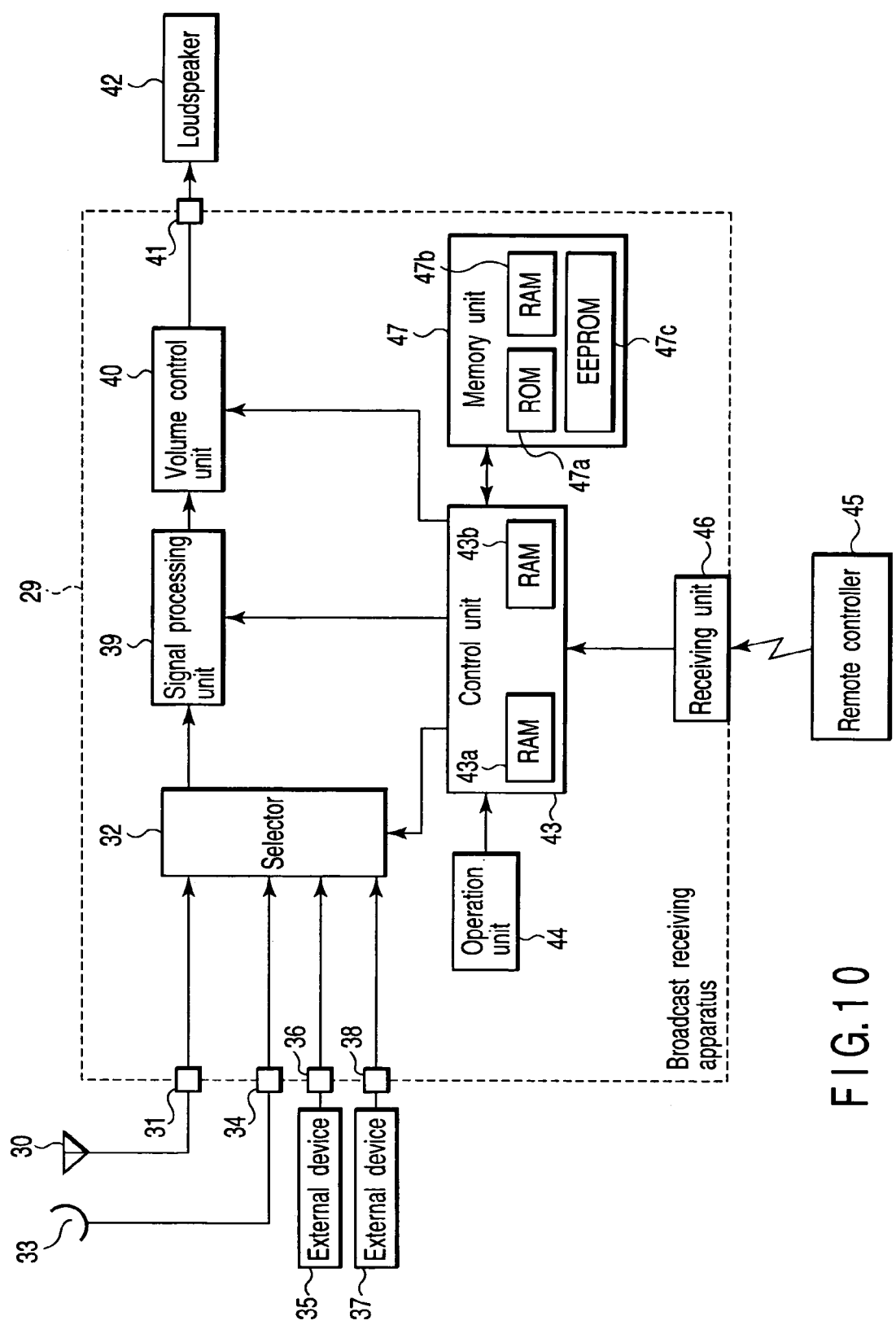
FIG. 10 is a block diagram shows a third embodiment of the invention to explain a broadcast receiving apparatus.

A third embodiment of the present invention will be described below. FIG. 10 shows a broadcast receiving apparatus 29 which will be described in the third embodiment. The broadcast receiving apparatus 29 comprises functions of receiving four sources which may be different source types, i.e., a function of receiving an analog broadcast, a function of receiving a digital broadcast, and a function of receiving an analog signal or a digital signal transmitted from an externally connected device.

More specifically, the analog broadcast signal is received by an antenna 30 and supplied to a selector 32 through an input terminal 31. A digital broadcast is received by an antenna 33 and supplied to the selector 32 through an input terminal 34.

In addition, an analog signal transmitted from an external device 35 such as a VTR (Video Tape Recorder) is supplied to the selector 32 through an input terminal 36. For example, an analog signal transmitted from an external device 37 such as a DVD (Digital Versatile Disk) drive is supplied to the selector 32 through an input terminal 38.

The selector 32 selectively switches the analog broadband signal, the digital broadband signal, the analog signal, and the digital signal to guide the switched signal to a signal processing unit 39. The signal processing unit 39 recognizes the source (i.e., it source type) and thus serves as an input data unit for obtaining the source information of the plurality of sources. The processing unit 39 processes the signals from the selector 32 to provide an analog video signal and an analog audio signal from the input analog broadcast signal, the digital broadcast signal, the analog signal, or the digital signal to output the audio signal to a volume control unit 40. The volume control unit 40 performs an amplification process to the input audio signal to achieve a volume corresponding to volume data to be externally supplied.

The audio signal amplified by the volume control unit 40 is supplied to a loudspeaker 42 through a sound output terminal 41 to reproduce sound at the volume corresponding to the volume data. The video signal output from the signal processing unit 39 will be omitted in the following description for descriptive convenience.

All the operations including the various receiving operation in the broadcast receiving apparatus 29 are integrally controlled by a control unit 43 serving as a control processor. The control unit 43 incorporates a CPU or the like. The control unit 43 receives operation information from an operation unit 44 or receives operation information transmitted from a remote controller 45 through a receiving unit 46. The control unit 43 controls the respective units to reflect the operation contents.

In this case, the control unit 43 uses a memory unit 47. More specifically, the memory unit 47 mainly includes a ROM 47a in which a control program executed by the CPU is stored, a RAM 47b which provides a work area to the CPU, and an EEPROM 47c in which various table, setting information, control information, and the like are stored.

The control unit 43 comprises a RAM 43a which is used to temporarily store information representing an input source (to be described later) and a RAM 43b which is used to temporarily store volume data output to the volume control unit 40.

When a user performs a source switching operation with the operation unit 44 or the remote controller 45, the control unit 43 generates switching data corresponding to the operation, outputs the switching data to perform a switching control to the selector 32. In this case, the control unit 43 updates source information stored in the RAM 43a each time sources are switched.

When the user performs a volume control operation with the operation unit 44 or the remote controller 45, the control unit 43 generates volume data corresponding to the operation, temporarily stores the volume control operation in the RAM 43b, and outputs the volume data to the volume control unit 40. Also in this case, the control unit 43 updates the volume data stored in the RAM 43b each time volume data are changed.

The control unit 43, as shown in FIG. 11, forms a table in which sources (the input terminals 31, 34, 36, and 38) and volume data are associated with each other and stores the table in the EEPROM 47c of the memory unit 47. In this case, the volume data is, e.g., 4-bit data. In accordance with the value of the data, a gain of the volume control unit 40 is determined.

When the sources (the input terminals 31, 34, 36, and 38) are switched or when a power supply switch included in the operation unit 44 of the broadcast receiving apparatus 29 is turned off, source information temporarily stored in the RAM 43a and volume data temporarily stored in the RAM 43b are stored in the table in association with each other.

For this reason, when the control unit 43 receives the same source as a previously received source, the control unit 43 reads volume data corresponding to the source from the table in the memory unit 47 to supply the volume data to the volume control unit 40. In this manner, a volume is controlled to be constant for the same source.

Figure 12:
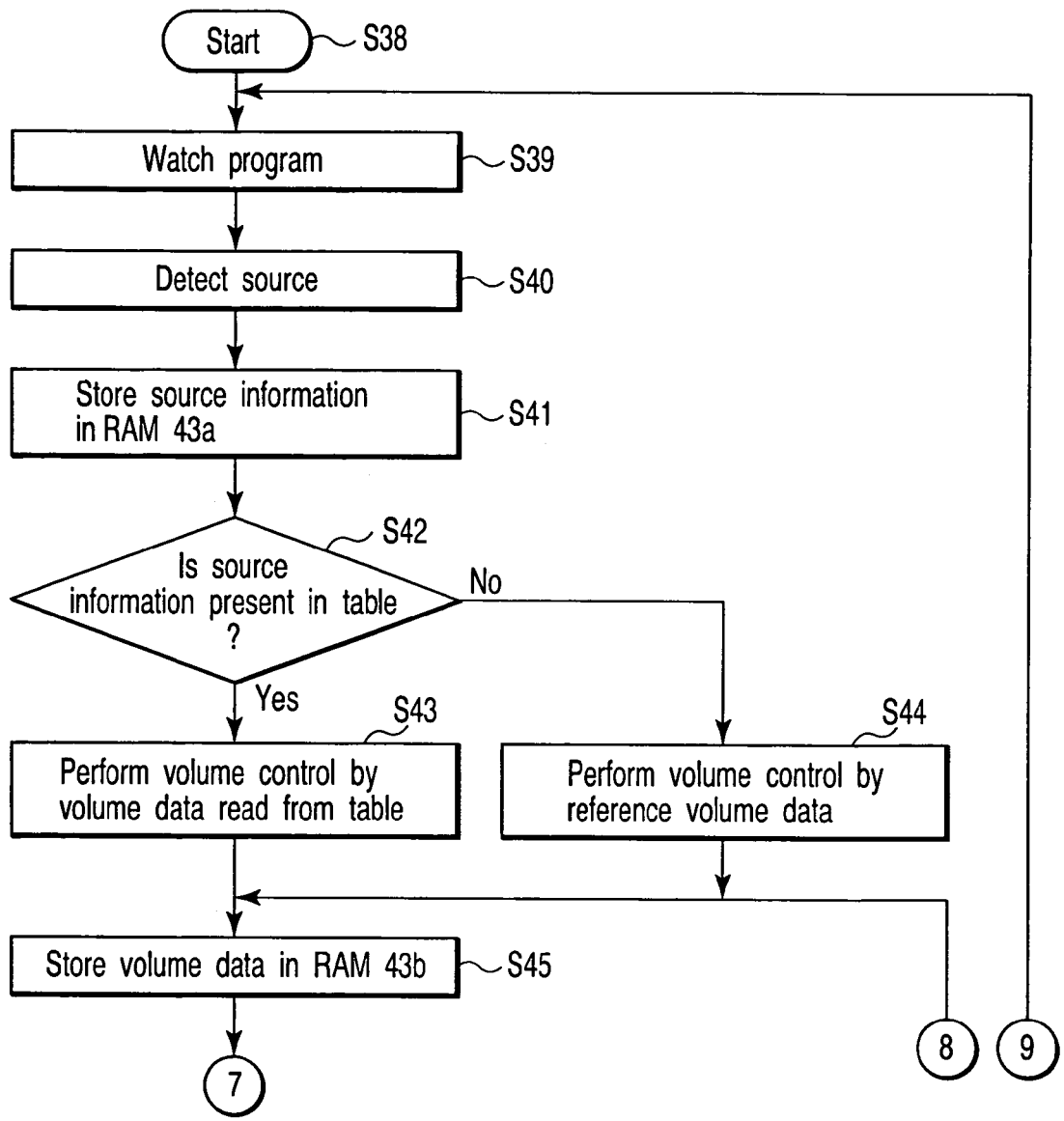
FIG. 12 is a flow chart for explaining a part of a main operation of the broadcast receiving apparatus according to the third embodiment.
Figure 13:
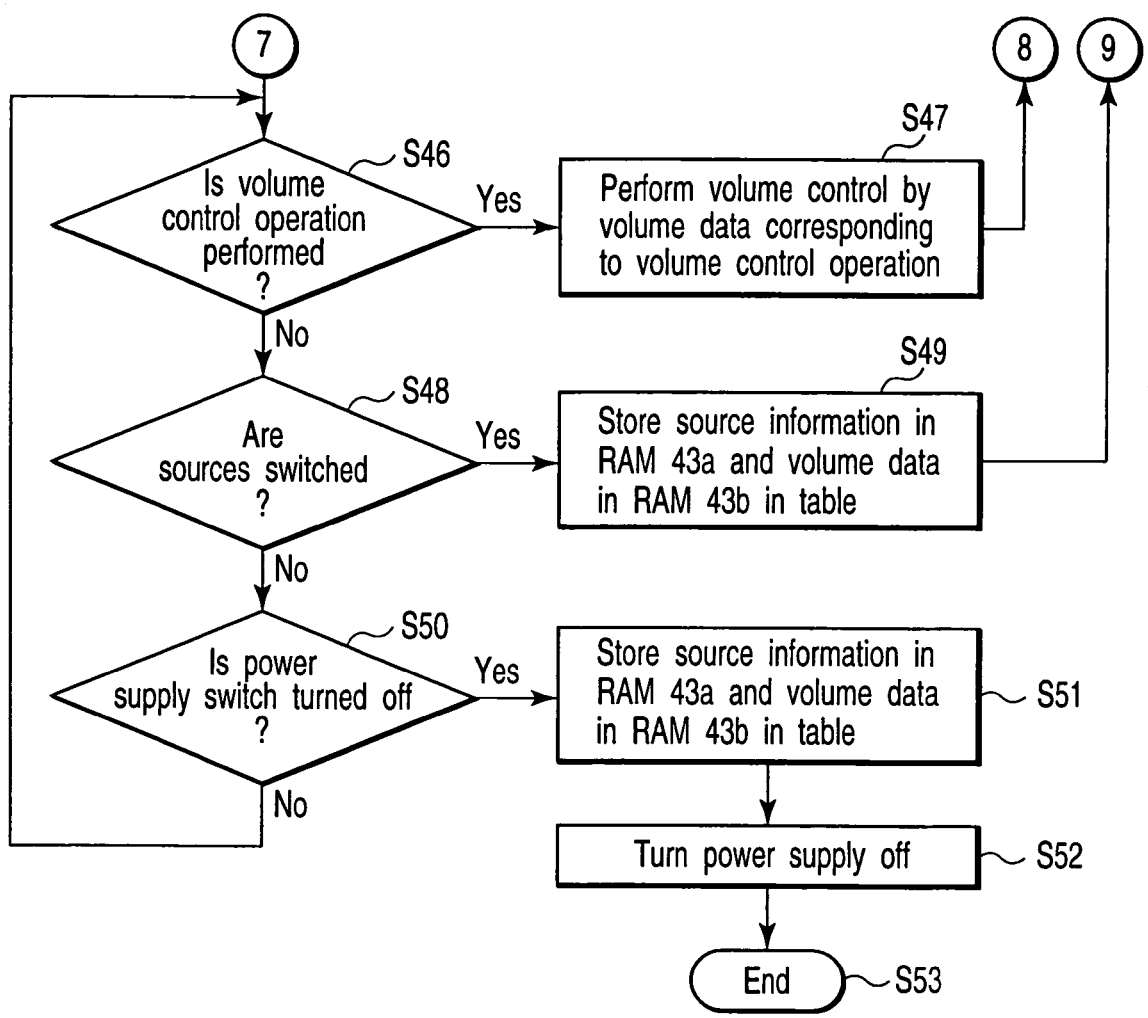
FIG. 13 is a flow chart for explaining the rest of the main operation of the broadcast receiving apparatus according to the third embodiment.

FIGS. 12 and 13 show flow charts collectively showing the automatic volume control operation according to the third embodiment shown in FIG. 10. When the processes are started (step S38), and when a predetermined program from a predetermined source is watched in step S39, the control unit 43 detects a source (the input terminal 31, 34, 36, or 38) which is currently selected in step S40, and the control unit 43 temporarily stores the detected source information in the RAM 43a in step S41.

The control unit 43 checks in step S42 whether or not the detected source information is stored in the table in the EEPROM 47c of the memory unit 47. When it is determined that the source information is stored (YES), the control unit 43 reads the volume data from the table and supplies the volume data to the volume control unit 40 to automatically control the volume in step 43.

When it is determined in step S42 that the detected source information is not stored in the table (NO), the control unit 43 reads reference volume data stored as a set value in the EEPROM 47c in advance and supplies the reference volume data to the volume control unit 40 to automatically control the volume in step S44.

After step S43 or S44, the control unit 43 temporarily stores the volume data used in step S43 or step S44 in the RAM 43b in step S45.

Thereafter, the control unit 43 checks in step S46 whether or not a volume control operation is performed with the operation unit 44 or the remote controller 45. When it is determined that the volume control operation is performed (YES), volume data corresponding to the volume control operation is generated to change the volume in step S47. The resultant volume data is temporarily stored in the RAM 43b in step S45.

When it is determined in step S46 that the volume control operation is not performed (NO), the control unit 43 checks in step S48 whether or not sources are switched. When it is determined that the sources are switched (YES), in step S49, the source information temporarily stored in the RAM 43a and the volume data temporarily stored in the RAM 43b are associated with each other and stored in the table in the EEPROM 47c to return the control flow to the process in step S39.

On the other hand, if it is determined in step S48 that the sources are not switched (NO), the control unit 43 checks in step S50 whether or not the power supply switches arranged in the operation unit 44 and the remote controller 45 in the broadcast receiving apparatus 29 are turned off. When it is determined that the power supply switches are not turned off (NO), the control flow is returned to the process in step S46.

In addition, it is determined in step S50 that the power supply switches are turned off (YES), the control unit 43 associates the source information temporarily stored in the RAM 43a and the volume data temporarily stored in the RAM 43b with each other and stores the source information and the volume data in the table in the EEPROM 47c in step S51. In step S52, the control unit 43 turns off the power supply of the broadcast receiving apparatus 29 to end the processes (step S53).

According to the third embodiment described above, when sources are switched and when the power supply switch is turned off, the source (the input terminal 31, 34, 36, or 38) which is immediately previously received and volume data which is generated at this time are stored in the table in the EEPROM 47c of the memory unit 47 in association with each other.

For this reason, when the same source as a source which is previously received is received, volume data corresponding to the source is read from the memory unit 47 to supply the volume data to the volume control unit 40, so that the volume is automatically controlled to be constant for the same source. For this reason, handling for a user can be made convenient.

Figure 14:
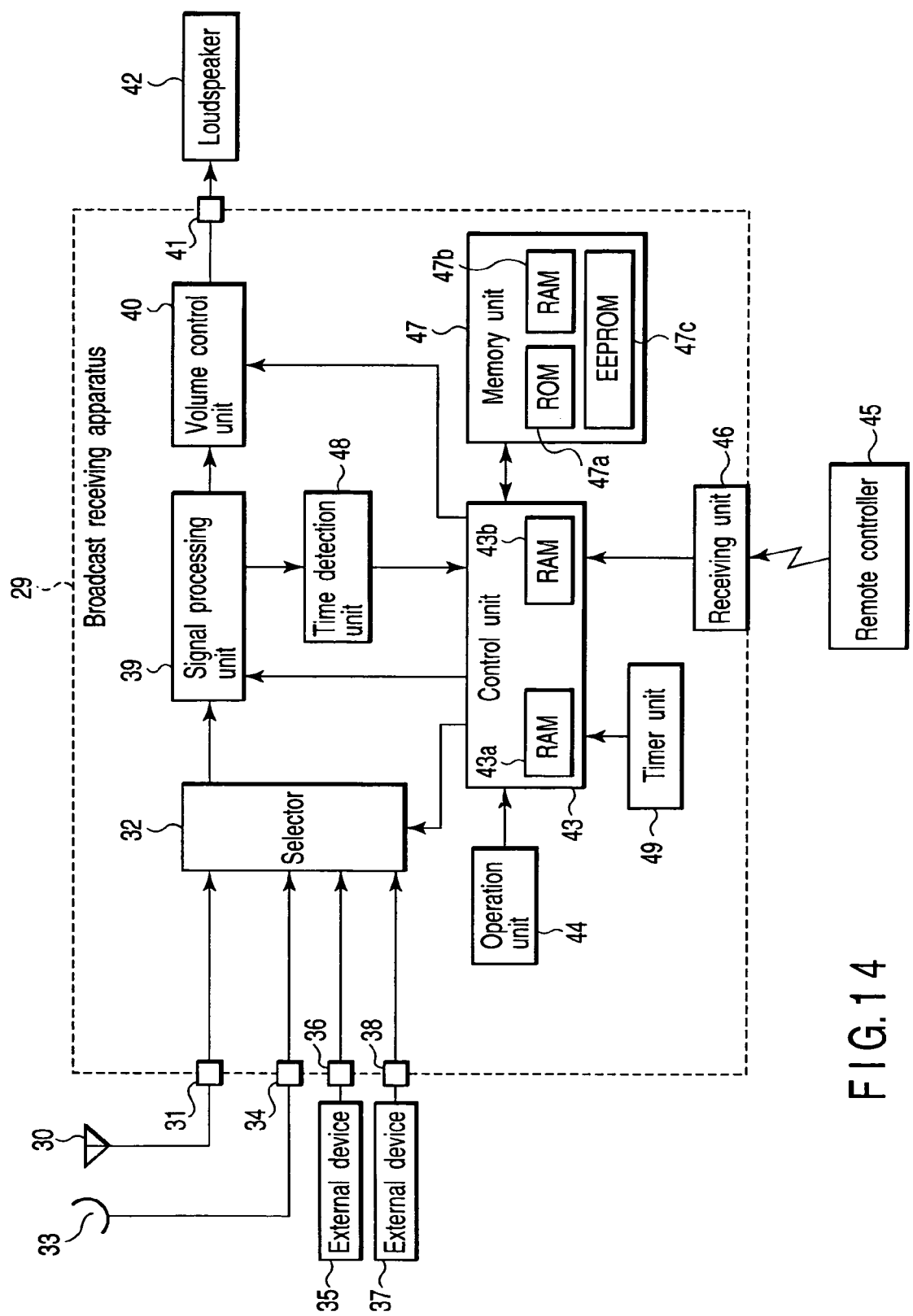
FIG. 14 is a block diagram showing a fourth embodiment of the invention to explain a broadcast receiving apparatus.

FIG. 14 shows a fourth embodiment of the invention. The fourth embodiment will be described below such that the same reference numerals as in FIG. 10 denote the same parts in FIG. 14. The signal processing unit 39 described above outputs a control signal to a time detection unit 48. The time detection unit 48 acquires time information from the control signal to output the time information to the control unit 43.

A timer unit 49 is also connected to the control unit 43. For this reason, the control unit 43 can acquires time information from the time detection unit 48 and/or the timer unit 49 as needed.

The control unit 43 divides one day into a plurality of time zones, e.g., "early morning", "daytime", and "midnight". As shown in FIG. 15, a table in which sources, time zones, and volume data are associated with each other is formed and stored in the EEPROM 47c of the memory unit 47. For this reason, a volume can be automatically changed depending on time zones such that volume of the same source is set to be smaller at midnight than in the daytime.

Figure 16:
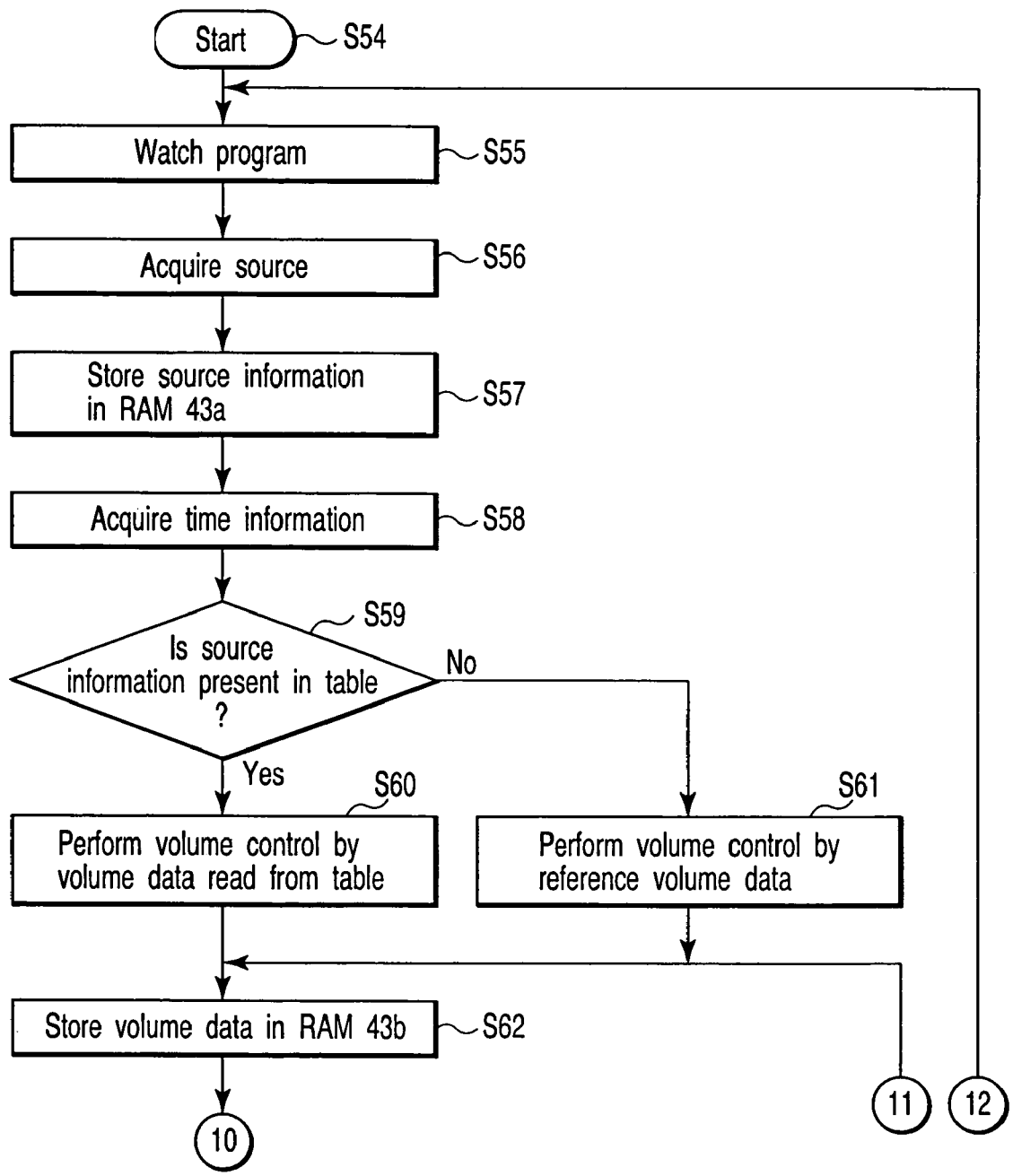
FIG. 16 is a flow chart for explaining a part of a main operation of the broadcast receiving apparatus according to the fourth embodiment.
Figure 17:
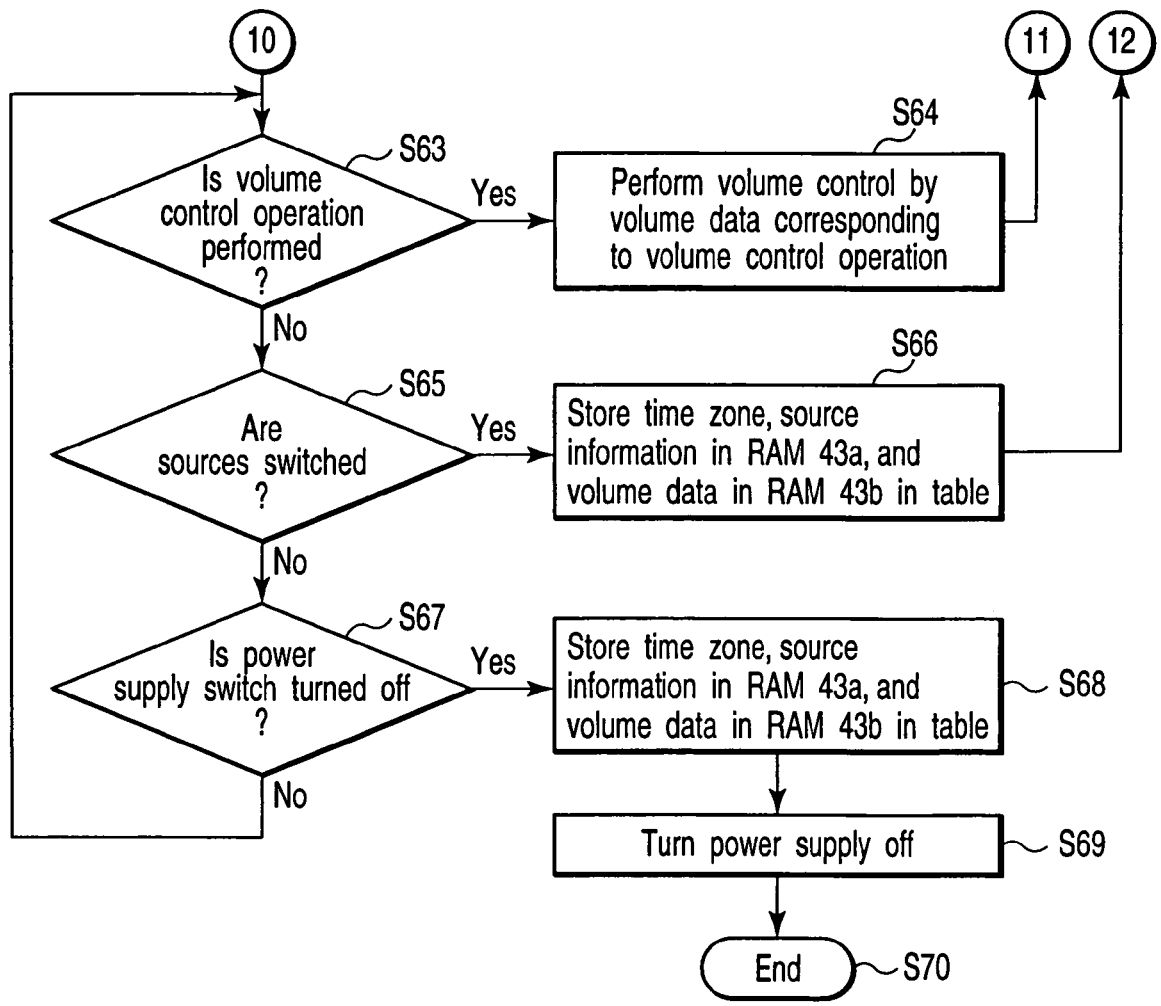
FIG. 17 is a flow chart for explaining the rest of the main operation of the broadcast receiving apparatus according to the fourth embodiment.

FIGS. 16 and 17 show flow charts collectively showing the automatic volume control operation. When the processes are started (step S54), and when a program from a predetermined source is watched in step S55, the control unit 43 detects a source (the input terminal 31, 34, 36, or 38) which is selected at the present in step S56, and the control unit 43 temporarily stores the detected source information in the RAM 43a in step 57 and then acquires current time information in step S58.

The control unit 43 checks in step S59 whether or not the detected source information is stored in the table in the EEPROM 47c of the memory unit 47. When it is determined that the source information is stored (YES), the control unit 43 reads the volume data stored in the table in the memory unit 47 in accordance with the detected source information and the time zone including the acquired current time in step S60. The control unit 43 supplies the volume data to the volume control unit 40 from the table to automatically control the volume.

When it is determined in step S59 that the detected source information is not stored in the table (NO), the control unit 43 reads reference volume data stored as a set value in the EEPROM 47c in advance and supplies the reference volume data to the volume control unit 40 to automatically control the volume in step 61.

After step S60 or S61, the control unit 43 temporarily stores the volume data used in step S60 or step S61 in the RAM 43b in step S62.

Thereafter, the control unit 43 checks in step S63 whether or not a volume control operation is performed with the operation unit 44 or the remote controller 45. When it is determined that the volume control operation is performed (YES), volume data corresponding to the volume control operation is generated to change the volume in step S64. The resultant volume data is temporarily stored in the RAM 43b in step S62.

When it is determined in step S63 that the volume control operation is not performed (NO), the control unit 43 checks in step S65 whether or not sources are switched. When it is determined that the sources are switched (YES), in step S66, the time zone including the current time acquired in step S58, the source information temporarily stored in the RAM 43a, and the volume data temporarily stored in the RAM 43b are associated with each other and stored in the table in the EEPROM 47c to return the control flow to the process in step S55.

It is determined in step S65 that the sources are not switched (NO), the control unit 43 checks in step S67 whether or not the power supply switches arranged in the operation unit 44 and the remote controller 45 in the broadcast receiving apparatus 29 are turned off. When it is determined that the power supply switches are not turned off (NO), the control flow is returned to the process in step S63.

In addition, if it is determined in step S67 that the power supply switches are turned off (YES), the control unit 43 associates the time zone including the current time acquired in step S58, the source information temporarily stored in the RAM 43a, and the volume data temporarily stored in the RAM 43b with each other and stores, the time zone, the source information, and the volume data in the table in the EEPROM 47c in step S68. In step S69, the control unit 43 turns off the power supply of the broadcast receiving apparatus 29 to end the processes (step S70).

According to the fourth embodiment described above, since sources, time zones, and volume data are stored in the table in the EEPROM 47c of the memory unit 47 in association with each other, a volume can be automatically changed depending on time zones even in the same source, and handling for a user can be more convenient.

The invention is not directly limited to the embodiments described above. In an execution phase, the present invention can be embodied such that constituent elements are variously changed without departing from the spirit and scope of the invention. When a plurality of constituent elements disclosed in the above embodiments are appropriately combined to each other, various inventions can be achieved. For example, some constituent elements may be omitted from all the constituent elements described in the embodiments. Furthermore, the constituent elements according to different embodiments may be appropriately combined to each other. As non-limiting examples, a category information acquiring unit may be easily added to the embodiment of FIG. 14, and FIG. 15 may be expanded to include the category information in the stored table. Further, the time zone data may be omitted from FIGS. 14 and 15, and the source data may be stored only in association with the category data and the volume data.

What is claimed is:

1. An audio receiving method comprising the steps of:
receiving a plurality of programs including audio signals;
adjusting sound volumes produced by said audio signals by utilizing inputs from a user for said plurality of received programs;
acquiring data representing at least one of a category of each of said plurality of programs, a time period during the day in which said plurality of programs is received and a source for said plurality of programs;
storing, in a memory, associations of said adjusted sound volumes and said at least one of the category of each of said plurality of programs, the time period during the day in which said plurality of programs is received and the source for said plurality of programs; and
receiving a current program having a current audio signal; and
automatically adjusting a sound volume produced by said current audio signal in accordance with said stored associations.

2. The audio receiving method as recited in claim 1, wherein said at least one of said category of each of said plurality of programs, said time period during the day in which said plurality of programs is received and said source for said plurality of programs is only said category.

3. The audio receiving method as recited in claim 1, wherein said at least one of said category of each of said plurality of programs, said time period during the day in which said plurality of programs is received and said source for said plurality of programs is only said time of day.

4. The audio receiving method as recited in claim 1, wherein said at least one of said category of each of said plurality of programs, said time period during the day in which said plurality of programs is received and said source for said plurality of programs is only said source.

5. The audio receiving method as recited in claim 1, wherein said at least one of said category of each of said plurality of programs, said time period during the day in which said plurality of programs is received and said source for said plurality of programs is only said category and time period.

6. The audio receiving method as recited in claim 1, wherein said at least one of said category of each of said plurality of programs, said time period during the day in which said plurality of programs is received and said source for said plurality of programs is each of said category, time of day and source.

7. A receiving apparatus according to claim 6, wherein the control unit is configured to supply preset reference volume data to the volume control unit when the category data is not stored in said memory unit.

8. An audio receiver apparatus comprising:
a receiver for receiving a plurality of programs including audio signals;
a sound volume adjusting device for adjusting sound volumes produced by said audio signals by utilizing inputs from a user for said plurality of received programs;
an input data unit for obtaining data representing at least one of a category of each of said plurality of programs, a time period during the day in which said plurality of programs is received and a source for said plurality of programs;
a memory for storing associations of said adjusted sound volumes and said input data representing said at least one of the category of each of said plurality of programs, the time period during the day in which said plurality of programs is received and the source for said plurality of programs; and
a control processor connected to receive the data from the input data unit and connected to receive the stored associations from said memory for automatically adjusting a sound volume produced by a current audio signal of a current program in accordance with said associations stored in said memory.

9. A receiving apparatus comprising:
a receiving unit configured to receive a signal including a program;
an acquiring unit configured to acquire category data representing a category of the program received by the receiving unit;
a volume data generating unit configured to generate volume data corresponding to a controlled volume in accordance with volume control performed by a user when the program received by the receiving unit is watched;
a memory unit configured to store said category data in association with said volume data; and
a control processor connected to receive said category data acquired from said acquiring unit and connected to said memory unit for automatically adjusting a sound volume of a current program in accordance with said associations stored in said memory units
wherein said control processor is operative to store said category data in association with said volume data upon detecting a new category data representing a change in category data of a new program just being received by the receiving unit.

10. The receiving apparatus as recited in claim 9, wherein said control processor is operative to store said category data and said volume data in association with one another upon detecting any one of: a new category data representing a change in category data of a new program just being received by the receiving unit, a change in a channel being received by the receiving unit and a power supply to said apparatus being turned off.

11. The receiving apparatus as recited in claim 9, further comprising:
a time acquiring unit operative to provide time data of said current program;
said control processor operative to store in said memory unit, in association with one another, said category data, said volume data and said time data.

12. The receiving apparatus as recited in claim 11, wherein said control processor is operative to store said category data, said time data and said volume data in association with one another upon detecting any one of: a new category data representing a change in category data of a new program just being received by the receiving unit, a change in a channel being received by the receiving unit a change in time data and a power supply to said apparatus being turned off.

13. A program receiving apparatus comprising:
a receiving unit configured to receive a program;
a signal processing unit configured to generate an audio signal of the program received by the receiving unit;
a volume control unit configured to convert the audio signal into sound having a volume controlled in accordance with a volume control operation;
an acquiring unit configured to acquire category data representing a category of the program received by the receiving unit;
a storage unit configured to store a table in which the category data and volume data corresponding to the controlled volume are associated with each other for a plurality of previously received programs having different categories; and
a control unit configured to read the volume data from the table in the storage unit associated with a category of a current program and to supply the volume data to the volume control unit to control the volume of the current program.

14. The receiving apparatus as recited in claim 13, wherein
the storage unit is configured to store in said table, said category data, said volume date and time zone data in association with each other, said time zone data representing a period of the day during which said program is received; and
the control unit is configured to read from said storage unit said volume data associated with time zone data corresponding to a current time and associated with category data corresponding the category of a currently received program and for supplying the read volume data to the volume control unit.

15. A receiving apparatus comprising:
a receiving unit configured to receive a signal including a program;
an acquiring unit configured to acquire category data representing a category of the program received by the receiving unit;
a volume data generating unit configured to generate volume data corresponding to a controlled volume in accordance with a volume control operation performed by a user when the program received by the receiving unit is watched;
a memory unit configured to store said category data in associated with said volume data; and
a processing unit configured to generate an audio signal of the program received by the receiving unit;

a volume control unit configured to convert the audio signal generated by the processing unit into a volume signal corresponding to the volume data; and a control unit configured to read, from the memory unit, the volume data associated with the category data corresponding to the category of the current program being received by the receiving unit and to supply the volume data to the volume control unit.

16. A sound reproducing apparatus comprising:

a receiving unit configured to selectively receive signals from a plurality of sources including an audio signal;

a control unit responsive to said plurality of sources for generating source data corresponding to each of said plurality of sources;

a volume data generating unit configured to generate volume data corresponding to a controlled volume in accordance with volume control operations performed by a user when the source received by the receiving unit is watched;

a memory unit configured to store said source data in association with said volume data; and said control unit connected to said memory unit for automatically adjusting a sound volume of a current program in accordance with source data of said current program and said associated volume data stored in said memory unit, wherein said control unit is operative to store in said memory unit a most currently set volume data by a user in association with said source data at a timing when a power supply to said sound reproducing apparatus is turned off.

17. A sound reproducing apparatus according to claim 16, wherein said memory unit stores time zone data generated in accordance with a volume control operation data.

18. A sound reproducing apparatus according to claim 17, wherein said control unit is operative to store in said memory unit a most currently set volume data by a user in association with said source data and said time zone data at a timing when a power supply to said sound reproducing apparatus is turned off.

19. A sound reproducing apparatus comprising:

a receiving unit for selectively receiving signals from a plurality of sources including an audio signal;

a processing unit for generating the audio signal of the signal received by the receiving unit;

a control unit responsive to said plurality of sources for generating source data corresponding to each of said plurality of sources;

a volume control unit for converting the audio signal generated by the processing unit into a volume signal corresponding to volume data;

a storage unit for storing associations of said source data and said volume data based on previously set volume data by a user upon viewing each of said plurality of sources; and said control unit reading from said storage unit the volume data associated with source data of a currently watched program and supplying said read volume data to the volume control unit, wherein the storage unit stores a time zone data stored in association with said volume data and said source data; and wherein said control unit operative for reading from said storage unit volume data associated with source data corresponding to a current source being watched and time zone data corresponding to a current time zone during which a current program of said current source is being watched and supplying the read volume data to the volume control unit.

20. A sound reproducing apparatus comprising:

a receiving unit for selectively receive signals from a plurality of sources;

a control unit responsive to said plurality of sources for generating source data corresponding to each of said plurality of sources;

a volume data generating unit for generating volume data corresponding to a controlled volume in accordance with volume control performed when the source received by the receiving unit is watched;

a detection unit configured to detect switching between one of said plurality of sources to another of said plurality of sources from the receiving unit;

a memory unit for storing in response to a detection result from the detection unit source data and associated volume data of a program being watched immediately before switching of said source;

a processing unit for generating audio signals from the signals received by the receiving unit;

a volume control unit for converting the audio signals generated by the processing unit into a volume signal corresponding to the volume data; and said control unit reading from said storage unit the volume data associated with source data of a currently watched program and supplying said read volume data to the volume control unit.

21. A sound reproducing apparatus according to claim 20, wherein the control unit is operative to supply preset reference volume data when the source data is not stored in said memory unit.

22. A sound reproducing apparatus comprising:

a receiving unit configured to selectively receive signals from a plurality of sources including an audio signal;

a control unit responsive to said plurality of sources for generating source data corresponding to each of said plurality of sources;

a volume data generating unit configured to generate volume data corresponding to a controlled volume in accordance with volume control operations performed by a user when the source received by the receiving unit is watched;

a memory unit configured to store said source data in association with said volume data; and said control unit connected to said memory unit for automatically adjusting a sound volume of a current program in accordance with source data of said current program and said associated volume data stored in said memory unit, wherein said memory unit stores time zone data generated in accordance with a volume control operation data, and wherein said control unit is operative to store in said memory unit a most currently set volume data by a user in association with said source data and said time zone data at a timing when a power supply to said sound reproducing apparatus is turned off.

* * * * *